United States Patent [19]

Willis

[11] Patent Number: 4,619,071

[45] Date of Patent: Oct. 28, 1986

[54] RODENT BAIT STATION

[76] Inventor: Donald W. Willis, P.O. Box 291, Lompoc, Calif. 93436

[21] Appl. No.: 699,895

[22] Filed: Feb. 8, 1985

[51] Int. Cl.⁴ ............................................ A01M 25/00
[52] U.S. Cl. ........................................ 43/131; 43/124
[58] Field of Search .......................... 43/131, 121, 124

[56] References Cited

U.S. PATENT DOCUMENTS

| | | | |
|---|---|---|---|
| 4,026,064 | 5/1977 | Baker | 43/131 |
| 4,161,079 | 7/1979 | Hill | 43/131 |
| 4,349,982 | 9/1982 | Sherman | 43/131 |
| 4,453,337 | 6/1984 | Williams | 43/131 |

FOREIGN PATENT DOCUMENTS 193851  1/1938  Switzerland ........................... 43/131

*Primary Examiner*—Nicholas P. Godici
*Assistant Examiner*—Kurt Rowan
*Attorney, Agent, or Firm*—Robert K. Rhea

[57] ABSTRACT

A rodent poison bait station including a rectangular housing forming an enclosure cooperating with bait retaining panels to form a pair of bait containing compartments within the housing laterally of a pair of generally axially aligned rodent entrance holes. The bait retainers are offset from the entrance holes and maintained spaced-apart by bait confining rails extending therebetween which prevent bait being moved toward the entrance holes from the bait compartments. Access to the bait compartments by the rodent is achieved by rodent destruction of a grid covering a window in a panel forming a part of the bait compartment.

1 Claim, 4 Drawing Figures

RODENT BAIT STATION

BACKGROUND OF THE INVENTION

1. Field of the Invention

The present invention relates to rodent control and more particularly to a non-refillable and disposable bait station which is convenient and safe in use.

In order to control rodent population by the use of poison bait it is necessary to meet standards required by the Environmental Protection Agency of the U.S. Federal Government such as, to contain the bait in a manner to provide access thereto by the target animals and preclude access to the bait by nontarget animals and children. One of the requirements is that the bait be contained in a tamper resistant and weather resistant box sufficiently rigid and designed to preclude entry by a nontarget specie. This could be accomplished to some extent by limiting the entrance dimensions, the use of baffles or by incorporating maze-like pathways from the entrance to the bait. Some such bait stations have required the refilling thereof for reuse which is generally unsatisfactory for the reason the box must be made in a manner to be disassembled or opened for refilling and is, therefore, hazardous to children and which is usually time consuming and usually involves some spillage or loss of the bait.

2. Description of the Prior Art

U.S. Pat. No. 4,453,337 discloses a rodent feed station formed by a hollow rectangular horizontally disposed housing having aligned rodent entrance holes in opposing side walls. A bait cup, within the housing and adjacent one wall, intersects the passageway between the entrance holes. The bait is contained behind a rodent openable grille disposed laterally of the path of a rodent entryway. Housing wall contacting baffles prevent rodent dispersion of the bait toward either of the entrance holes.

This invention is distinctive over the prior art including the above named patent by forming a rectangular hollow housing of transparent material for visual determination of the amount of bait remaining, which is factory sealed and disposed of when empty. The device of this invention is further characterized by aligned see-through rodent entrance holes and features dual bait holders disposed laterally of the passageway between the aligned entrance holes. The respective dual bait holders may contain two different flavored quantities of rodent bait.

SUMMARY OF THE INVENTION

This rodent bait station includes a pair of spaced bait retainers disposed within a hollow one piece inexpensive plastic material housing. The bait retainers contact inner wall surfaces of the housing to form rodent bait chambers with access to the bait provided by a rodent chewable grid covering a window in respective bait retainer panels. Grooves and pins, formed on the housing walls, secure the pair of retainers in place. A bottom sheet hingedly connected with a flanged edge of the housing forms the bottom wall thereof. Opposing side walls of the housing are respectively provided with a rodent entrance in axially aligned relation with each other so that a rodent entering either opening visually observes an exit which encourages rodent entry. Rails extend between the bait retainers, in contact with the housing bottom wall, prevent rodent scattering of the bait toward either of the entrance openings. An identifying label overlies the top wall of the housing to provide a sense of privacy for a rodent when in the housing.

The principal object of this invention is to provide a low cost low profile see-through disposable rodent bait station in which two different flavors of rodent toxic bait may be separately placed, is sturdily constructed and arranged to exclude nontarget animals and children from access to the bait and yet provide easy access to the bait by the target animals.

DESCRIPTION OF THE PREFERRED EMBODIMENT

Figure 1:
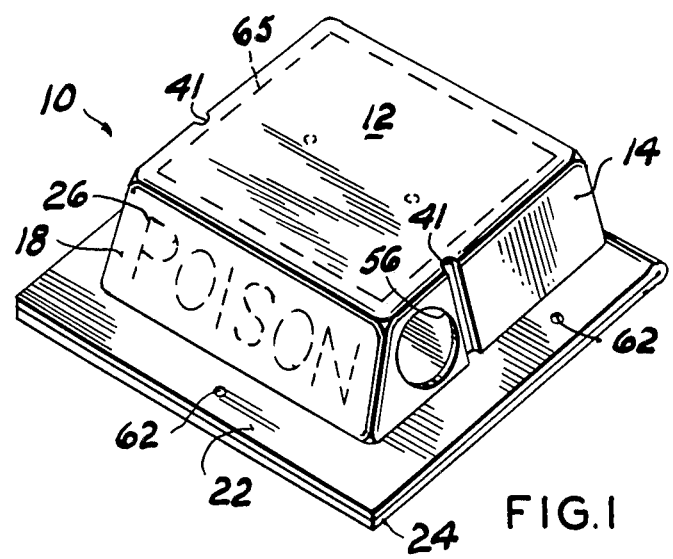
FIG. 1 is a perspective view of the device.
Figure 2:
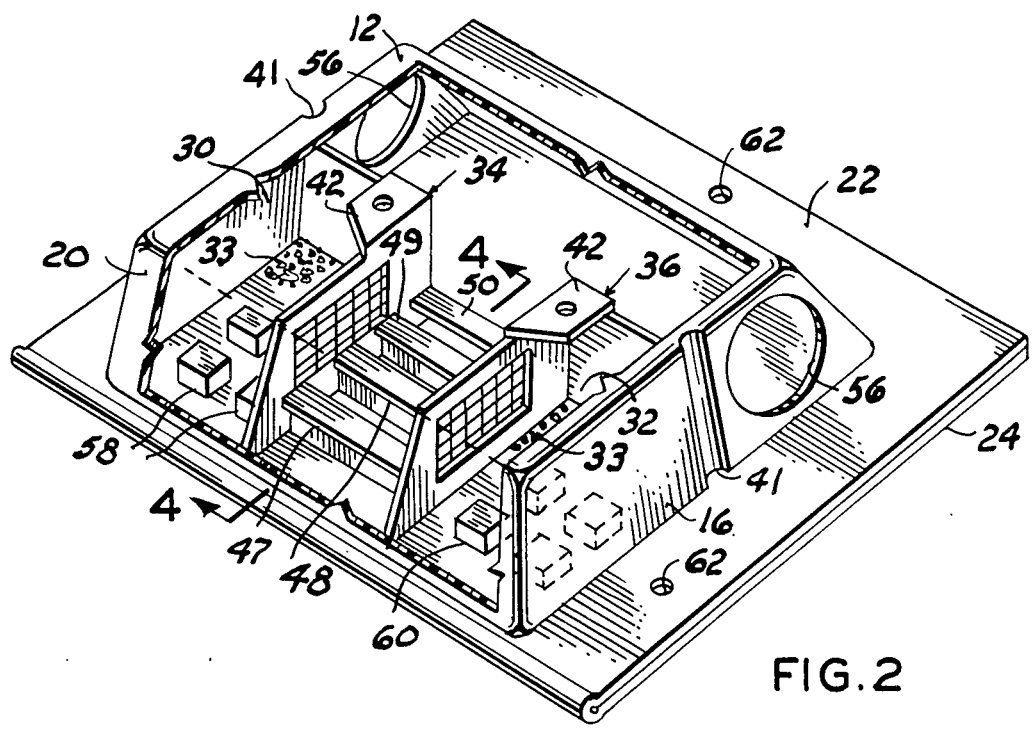
FIG. 2 is a fragmentary perspective view, to an enlarged scale, with parts broken away to expose the housing interior.

Like characters of reference designate like parts in those figures of the drawings in which they occur.

In the drawings:

The reference numeral 10 indicates the device, as a whole, which is rectangular flat-like in general configuration. The device 10 is preferably formed from thin semi-flexible transparent plastic material and is defined by a top wall 12, opposing side walls 14-16, a front wall 18 and a rear wall 20 depending from the top wall. The bottom edge portion of the respective wall is turned outwardly to form an outstanding housing surrounding flange 22 parallel with the top wall 12. The housing further includes a bottom wall 24 hingedly connected to the flange adjacent the rear wall 20 so that the bottom wall 24 may be pivoted to underlie the housing walls and flange 22. Either or both end walls 18 and 20 is preferably provided with indicia 26 as a warning of the toxic material contained by the device.

Bait retainer means 28 cooperates with the inner surface of the housing walls to form compartments 30 and 32 containing rodent bait 33. The bait retainer means 28 comprises a pair of retainers 34 and 36 each formed by a front panel 38 parallel with the front end wall 18 and joined in right angular relation at one end to a side panel 40. Each panel extends edgewise between the inner surface of the housing top and bottom walls and the free end edge of each panel 38 opposite their juncture respectively contacts the interior wall surface of the housing side walls 14-16 adjacent and rearwardly of vertical ridges 41 formed thereon to anchor the panels 38. The free end edge of the panels 40 contacts the inner surface of the rear end wall 20. A horizontal vertically apertured gusset 42 overlying the juncture of the panels 38 and 40 cooperatively receives a pin 44 depending from the housing top wall 12 to anchor the respective bait retainer 34 and 36 in place.

Figure 4:
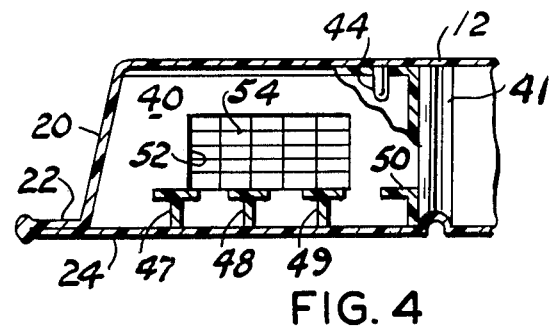
Figure 3:
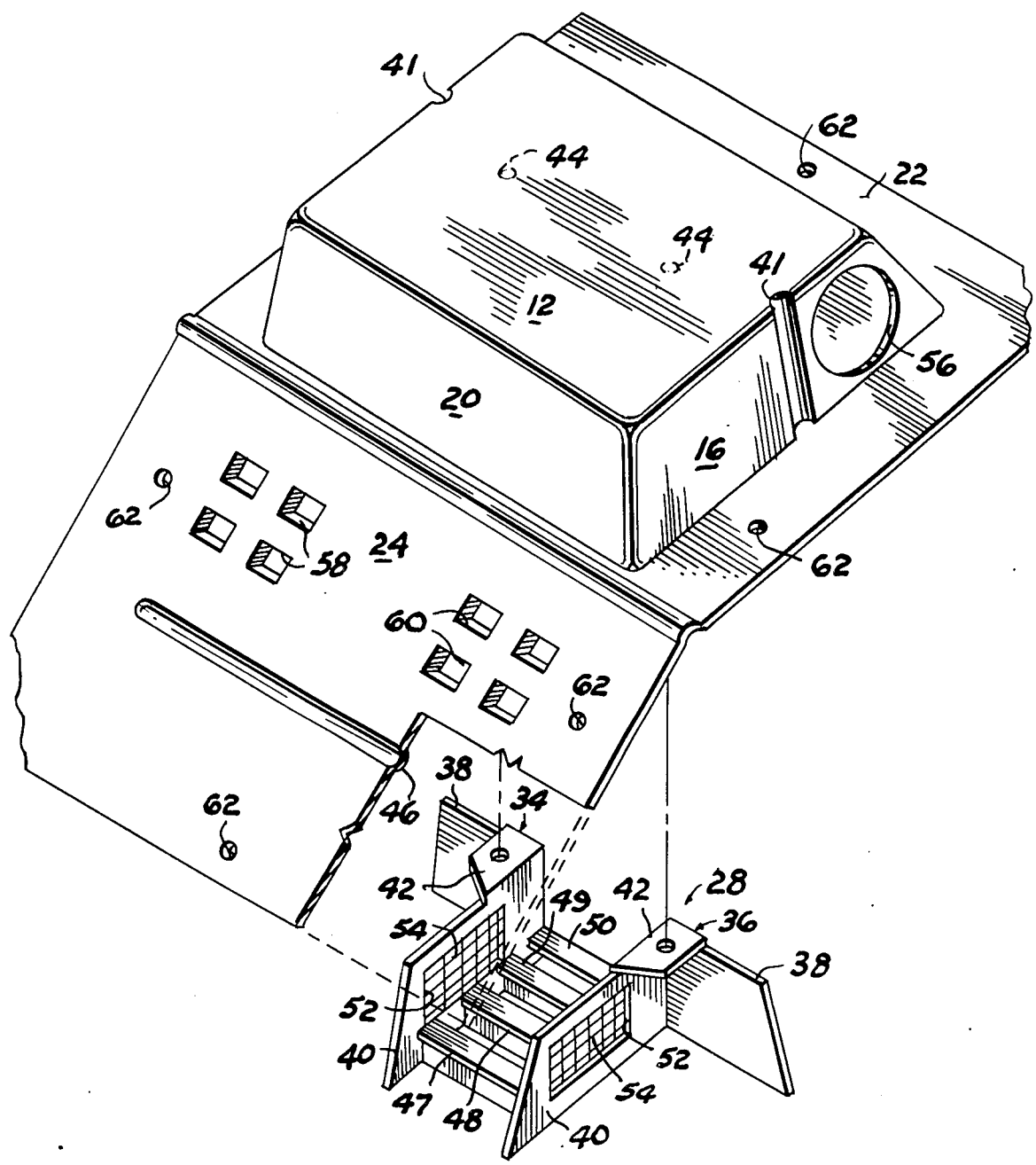
FIG. 3 is a fragmentary exploded perspective view of the bait station components; and, FIG. 4 is a fragmentary vertical cross sectional view, to a different scale, taken substantially along the line 4—4 of FIG. 2.

The downward or bottom edge portion of each bait retainer panel 38 abuts an upstanding ridge 46 formed on the bottom wall and extending transversely of the housing in aligned relation with respect to the side wall ridges 41. The bait retainers 40 are maintained in parallel spaced relation by a plurality of rails 47, 48, 49 and 50 extending therebetween adjacent their lower limit and in contact with the adjacent surface of the housing bottom wall 24. The two center rails 48 and 49 can be omitted or removed and a sachet of prebait, not shown, installed where prebaits are required. The rails 47-49 are T-shaped in transverse section with the top bar of the T disposed horizontally and the rail 50 is inverted L-shaped (FIG. 4).

Each of the retainer side panels 40 are provided with a window 52 closed by a rodent chewable grid 54. The grid or grille 54 may be plastic or other material easily destroyed by a rodent. The windows 52 are easily entered by the rodent to access the bait. When prepackaged bait sachets, not shown, are used the chewable grid 54 may be omitted.

The purpose of the rails 47-50 is to prevent bait removed from the compartments 30 and 32 being moved toward the entrance by the rodent.

Each of the housing side walls 14-16 is provided with a rodent entrance hole 56 adjacent the front wall 18. The holes 56 are formed in substantially axially aligned relation so that a rodent when entering one hole may see an exit opening and thus not be afraid to enter the housing. An identifying label, indicated by the dotted lines 65, overlies the housing top wall 12 and induces a sense of security to the target rodents when in the housing.

The housing bottom wall is further provided with a plurality of upstanding block-like protrusions 58 and 60 positioned within the respective bait compartment 30 and 32 for the purpose of anchoring or retaining rodent bait in block form, not shown.

OPERATION

In operation, a selected quantity of the rodent bait is placed within the housing compartments 30 and 32 at the factory prior to attaching the bottom wall to the housing flange, 22. The bottom wall is bonded to the flange by an adhesive or staples, not shown, in a manner to prevent separation of the housing bottom from the flange.

The device 10 is placed in a selected location and anchored to a supporting surface by nails, or the like, inserted through apertures 62 formed through the flange and bottom wall. Alternatively, the housing may be anchored by double sided adhesive tape interposed between the bottom wall and a supporting surface. Thereafter rodents seeking the bait enter either of the holes 56 and ruptures one of the screen grids 54 for access to the bait 33. Since the bait is disposed laterally of the axially aligned holes 56 and the rails 47-50 normally prevent movement of the bait toward the front wall 18 the bait station is substantially child safe and as well as safe for pets. The transparent walls surrounding the bait compartments visually indicate the amount of bait remaining and when consumed or determined unattractive to the target rodents the entire device 10 is disposed of and replaced with a like bait station.

Obviously the invention is susceptible to changes or alterations without defeating its practicability. Therefore, I do not wish to be confined to the preferred embodiment shown in the drawings and described herein.

I claim:

1. A rodent bait station, comprising:
    a housing formed from light weight semi-flexible plastic,
        said housing having a flat top wall and parallel generally rectangular depending side, front and rear end walls with an outstanding flange formed on the lower edge of the respective depending wall;
    a flat sheet forming a housing bottom wall hingedly secured to the outer limit of the flange on the rear end wall and adapted to be bonded to the outstanding flange of the respective walls,
        said side walls each having a rodent entry hole formed therein adjacent said front end wall in approximately axial aligned relation;
    a pair of bait retainers disposed in spaced-apart relation in said housing adjacent said rear wall and the respective side wall to define an open rodent compartment between the bait retainers,
        each bait retainer of said pair of bait retainers including a front panel and a side panel joined together at one end in substantially right angular relation respectively parallel with the housing front wall and housing side walls and extending between the housing top and bottom walls and contacting at their respective other ends the respective housing side wall and the housing rear end wall,
        each retainer side panel having a window facing in spaced-apart relation the window in the other side panel providing rodent access to contained bait;
    rail means including a plurality of rails, T-shaped in transverse section, extending in parallel spaced-apart relation between said bait retainer side panels for normally preventing movement of bait from said bait retainers toward said housing front wall; and,
    bait retainer anchor means including a vertically apertured gusset extending horizontally between and rigidly joining each said bait retainer front panel with the respective said bait retainer side panel and anchor pins depending from said housing top wall and projecting into the respective gusset aperture for preventing movement of said pair of bait retainers relative to said housing.

* * * * *